United States Patent [19]

Berman et al.

[11] 4,372,690
[45] Feb. 8, 1983

[54] THERMAL RADIATION MEASURING ARRANGEMENT

[75] Inventors: Herbert L. Berman; James C. Sprout, both of Los Altos, Calif.

[73] Assignee: Linear Corporation, Inglewood, Calif.

[21] Appl. No.: 241,467

[22] Filed: Mar. 6, 1981

[51] Int. Cl.³ .............................................. G01F 5/10
[52] U.S. Cl. ...................................... 374/29; 374/44; 374/121
[58] Field of Search ............. 73/15 A, 190 R, 190 H, 73/190 EW, 355; 374/29, 44, 121

[56] References Cited

U.S. PATENT DOCUMENTS

| | | | |
|---|---|---|---|
| 3,576,996 | 5/1971 | Stevens | 73/355 |
| 3,693,447 | 9/1972 | Sumihama | 73/341 |

Primary Examiner—Herbert Goldstein
Attorney, Agent, or Firm—Don B. Finkelstein

[57] ABSTRACT

In a thermal radiation measuring arrangement, a thermal radiation detector is located at the focal point of a collecting mirror, upon which incident thermal radiation from a surface, such as a building wall, is directed. The thermal radiation detector may be, for example, a thermopile, and provides an output signal having a magnitude proportional to the amount of thermal radiation which it receives. The temperature detection means detects the temperature of the thermal radiation detector and, for example, may detect the cold junction of the thermopile. In a first operating condition, a signal summing means receives the output signal from the thermal radiation detector and the temperature detection means and provides a third output signal proportional to the sum of these first and second output signals. In a second operating condition, a signal biasing means is connected into the signal summing means. The signal biasing means provides a signal to the signal summing means to cause the third output signal to become zero when radiation is received from a reference surface. When the arrangement is in the second operating condition and directed to receive thermal radiation from a second surface different from the reference surface, the signal biasing means maintains the same level of bias to the signal summing means as it did when detecting the radiation from the reference surface.

14 Claims, 6 Drawing Figures

THERMAL RADIATION MEASURING ARRANGEMENT

BACKGROUND OF THE INVENTION

1. Field of the Invention

This invention relates to the thermal radiation measuring art, and, more particularly, to an improved arrangement for measuring thermal radiation from surfaces, as well as measuring the rate of heat flow between surfaces. Sequential thermal radiation detection steps can be followed to provide a measurement of the insulating value of, for example, walls, or other structures.

2. Background of the Invention

In the measurement of heat loss from buildings, as well as other structures, as well as detecting insulation defects and measuring insulation values, it has generally been desired to perform such detections and/or measurements as rapidly as possible. Further, it has often been desired to provide such detection and/or measurement without direct contact with the structure, In buildings, for example, it is often desirable to know the heat loss from a building in order that appropriate insulation may be provided in the exterior walls thereof, as well as determining, for an existing building, the actual insulating value of the walls or other structures. There has heretofore been utilized several different techniques. In one technique, temperature measurements are made by direct contact with, for example, points on the inner surface and outer surface of an exterior wall. From the measured temperature difference the heat flow through the wall may be calculated. Such direct contact techniques have disadvantages in that the setup time for making the direct contact is comparatively lengthy at each location, and a comparatively large number of points of temperature measurement must be made in order to determine the overall heat flow through a wall.

In another technique which has heretofore been utilized, the inside surface and outside surface temperatures of a wall were measured indirectly by measuring the radiant output therefrom. From these measurements of the temperature by the radiation emitted from the wall surfaces, various nomographs and other charts were utilized to estimate both the heat flow through the wall, which is the heat energy lost, as well as the insulating value of the wall. Such techniques have required that various characteristics such as emissivity and the like be either ignored or approximated in making the appropriate measurements. This has often led to the introduction of errors in the measurements and other determinations based thereon. Further, even though the measurement of the temperature may be made more rapidly by detecting the radiation, this technique still suffers from most of the same disadvantages as the direct temperature measuring technique.

Since the ultimate desired result is a measurement of the actual heat flow through, for example, the exterior wall of a building, as well as obtaining the measurement of the insulating qualities of such a wall, it has long been desired to provide an accurate measurement directly of the heat flow rates involved.

SUMMARY OF THE INVENTION

Accordingly, it is an object of the present invention to provide an improved thermal radiation detection and measuring arrangement.

It is another object of the present invention to provide a thermal radiation measuring arrangement which provides a direct reading of the rate of thermal radiation received.

It is yet another object of the present invention to provide an arrangement which allows rapid and convenient determination of the insulating value of various structures.

The above and other objects of the present invention are provided, in a preferred embodiment thereof, in a hand-held gun-like structure. The structure has a case, and located within the case is a focusing mirror which receives thermal radiation incident thereupon, and focuses the thermal radiation at its focal point, at which is located a thermal radiation detector such as a thermopile. Also located within the case is a temperature detection means for detecting the temperature in regions containing the thermal radiation detector and, for example, when the thermal radiation detector is a thermopile, the temperature detection means may detect the cold junction thereof. Suitable circuitry is provided to allow two operating conditions of the hand-held gun-like arrangement. In a first operating condition, the output signals generated by the thermal radiation detector and the temperature detection means are summed in a signal summing means which generates a signal having a magnitude proportional thereto. The signal from the signal summing means may be applied to a digital voltmeter, which, in turn, powers the digital display to provide a direct digital readout proportional to the value of the output signal from the signal summing means. In this first operating condition, since the size of the thermal radiation detection means is known, the output can be provided to show the actual rate of thermal radiation received by the thermal detection means for the radiation emitted from a surface.

In the second operating condition, a signal biasing means is selectively connected into the signal summing means, to provide a signal bias sufficient to cause the output from the signal summing means to be zero. When the thermal radiation detection arrangement is then directed toward a second surface with a different temperature than the first surface, and still in the second operating condition, the readout, because of the effects of the signal biasing means, provides a direct readout in the heat flow between the first surface and the second surface.

Because the heat flow may be, for example, an order of magnitude lower than the rate of thermal radiation received, a sensitivity control means may be provided to provide a high gain for the output signal from the signal summing means in the second operating condition, and a low gain for the output signal from the signal summing means in the first operating condition.

With a capability of providing these two different direct output readings, rapid determination of the actual heat flow through, for example, the wall of a building, as well as the insulating value thereof, may be rapidly and quickly determined.

BRIEF DESCRIPTION OF THE DRAWING

The above and other embodiments of the present invention may be more fully understood from the following detailed description, taken together with the accompanying drawing, wherein similar reference characters refer to similar elements throughout, and in which.

DESCRIPTION OF THE PREFERRED EMBODIMENTS

Figure 1:
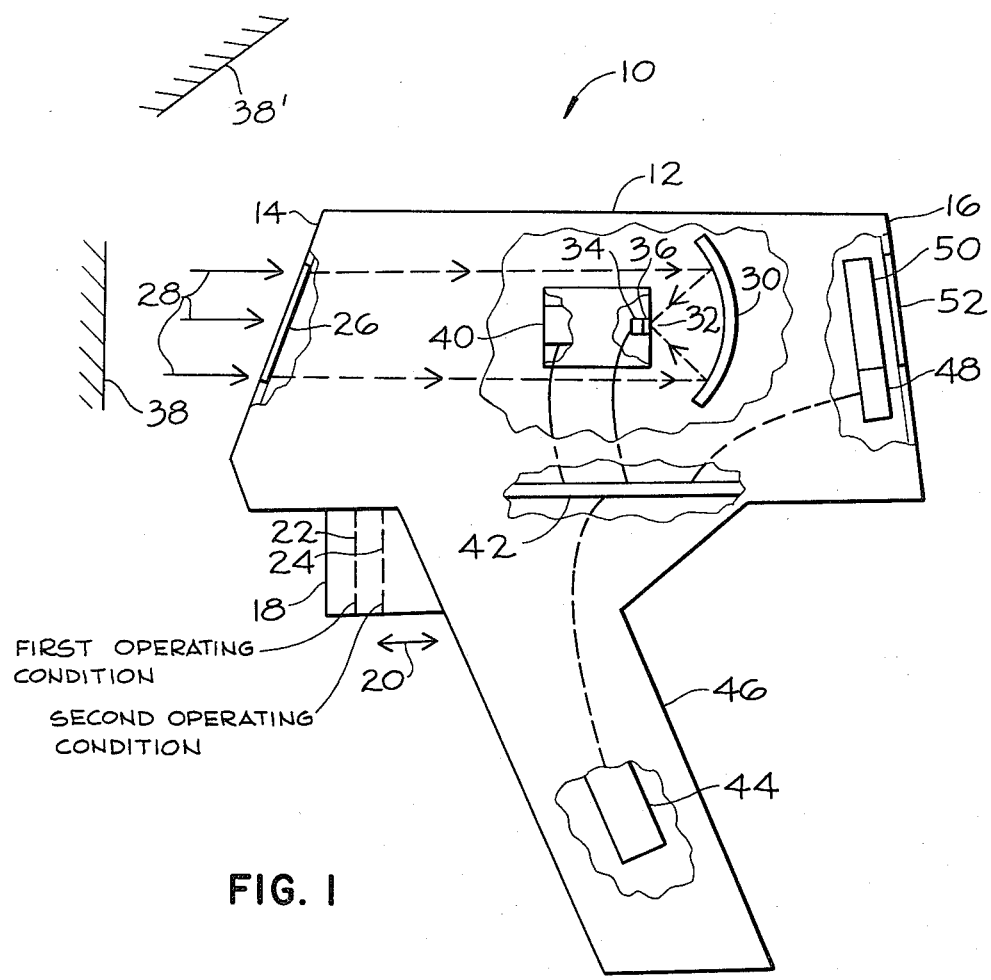
FIG. 1 illustrates a preferred embodiment of the present invention.

Referring now to FIG. 1, there is illustrated a preferred embodiment generally designated 10, of a thermal radiation measuring arrangement in accordance with the principals of the present invention. In embodiment 10, there is provided a case means 12, having a forward end 14 and a back end 16. In embodiment 10, the case means 12 is in the general configuration of a hand-held gun-like structure, and is provided with a trigger 18, movable in the directions indicated by the arrow 20. As shown in solid lines on FIG. 1, the trigger 18 is in the off position. The trigger 18 is movable to a first operating condition, as indicated by dotted line 22, and a second operating condition, as indicated by dotted line 24.

The forward end 14 of the case means 12 is provided with a window 26, transparent to electromagnetic radiation, such as thermal radiation, in a predetermined portion of the electromagnetic radiation spectrum, as indicated by the arrows 28. Window 26 may, for example, be polyethylene or the like. The electromagnetic radiation 28 enters the case means 12 through the window 26, and impinges upon a mirror 30, having a focal point 32 at which the radiation is directed.

A thermal radiation detection means 34 is provided at the focal point 32, and, if desired, may be also provided a filter 36 between the focal point 32 and the thermal radiation detector 34, so that the electromagnetic radiation passes through the filter 36 before impinging upon the thermal radiation detector 34. The filter 36 may, for example, be a dielectric coated germanium to provide approximately an 8 to 14 micron band width for passage of the electromagnetic radiation. Such a band width is preferred because, within the 8 to 14 micron band width, there are no strong $CO_2$ or $H_2O$ atmospheric absorption lines. Thus, substantially all the electromagnetic radiation in this band width, which is emitted from the surface 38, is received by the thermal radiation detection means 34. The thermal radiation detection means 34 has a predetermined area.

A temperature detection means 40 is located within the case means 12, in regions adjacent the thermal radiation detection means 34. It has been found that a thermopile may be utilized as the thermal detection means 34. When such a thermopile, which, for example, may be a Dexter Research Model 2M thermopile, is used, the temperature detection means 40, which, for example, may be a National Semiconductor's Model LM334, may be connected to the cold junction of the thermopile to provide a measurement of the temperature in the regions adjacent the thermal radiation detector 34.

A conventional circuit board 42, upon which is mounted the necessary circuitry for operation of the embodiment 10, which circuitry is described below in greater detail, is provided within the case 12. A battery 44, such as a 9-volt battery, is provided in the handle portion 46 of the case means 12 and is connected into the circuit board 42 to provide appropriate power to the components thereof.

A display means, generally designated 46, is also provided in the case means 12, and may comprise a digital voltmeter 48, connected to a digital display 50, which is viewed through the transparent window 52 in the rear end 16 of the case means 12.

Figure 2:
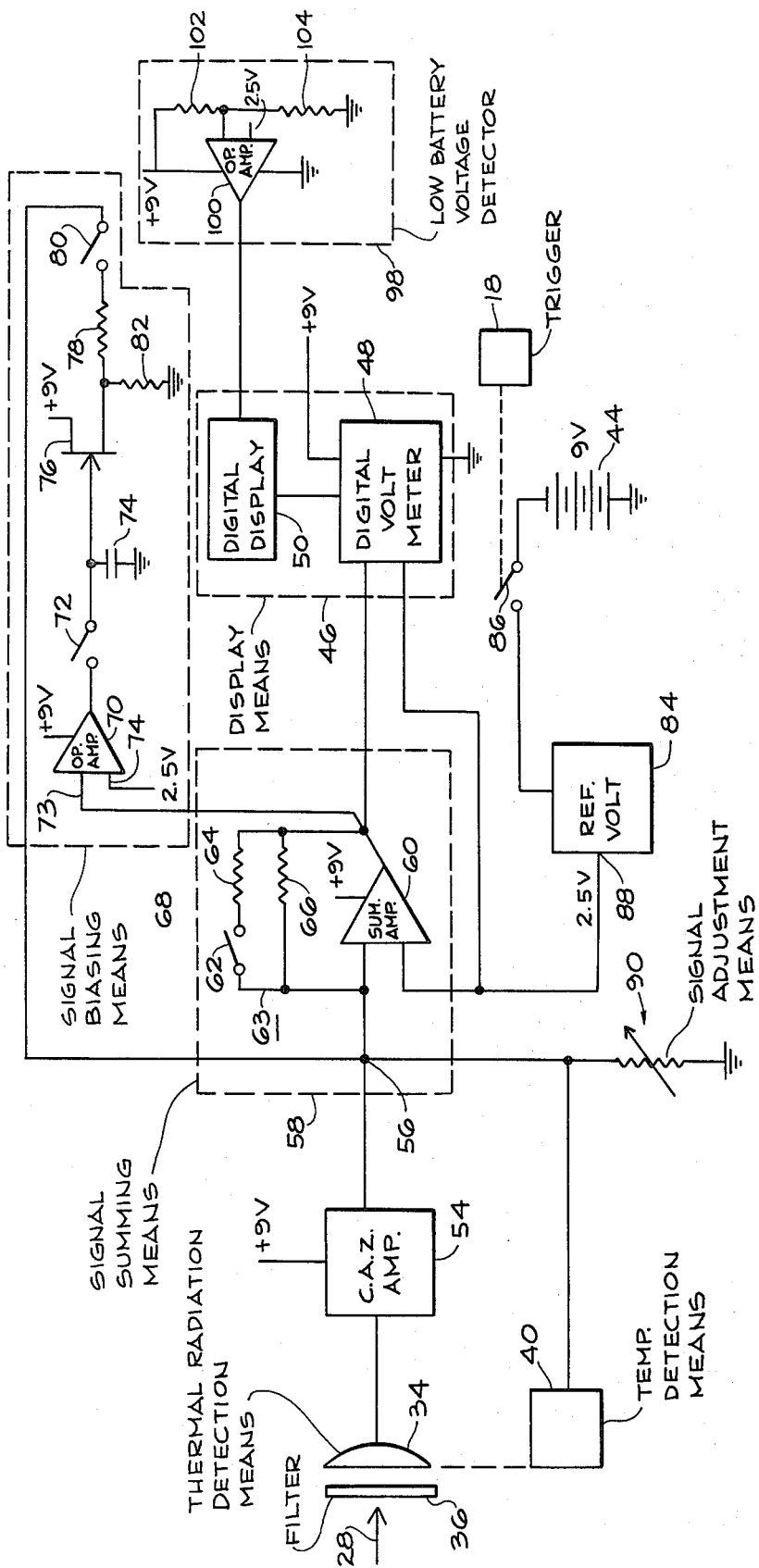
FIG. 2 is a block diagram illustrating the circuitry associated with a preferred embodiment of the present invention.

Referring now to FIG. 2, there is illustrated, in block diagram form, the circuitry associated with the preferred embodiment 10 of the present invention. As shown on FIG. 2, the thermal radiation 28 passes through the filter 36, to impinge upon the thermal radiation detector 34. A first output signal is generated by the thermal radiation detection means 34, and is amplified by a precision DC amplifier such as a commutating automatic zero amplifier, manufactured by Intersil, Model 7600. The C.A.Z. amplifier is generally designated 54, and the output therefrom is directed to a summing junction 56. A temperature detection means 40 is provided to detect the temperature, as noted above, in regions adjacent the thermal radiation detection means 34, and the temperature detection means 40 generates a second output signal having a magnitude proportional to the detected temperature, and is also connected to the summing junction 56. The summing junction 56 is part of the signal summing means 58, which also comprises a summing amplifier such as the operational amplifier sold by Precision Monolithics, Model OP07, and generally designated 60. The signal summing means also comprises switch 62, which is a normally closed switch, and resistors 64 and 66. The output from the summing amplifier 60 is a third output signal which is provided to the display means 46, and connected, for example, to the digital voltmeter 48 which generates a display signal having a magnitude proportional to the third output signal, and the display signal is provided to the digital display 50 which generates the above described digital readout of the magnitude of the display signal generated by the digital voltmeter 48.

A signal biasing means, generally designated 68 is also provided, and the function of the signal biasing means is described below in greater detail. The signal biasing means 68 generally comprises an operational amplifier 70, having an input 73 which is connected to the output of the summing amplifier 60 and is also provided with the reference voltage of 2.5 volts at its other input 74. The output of the operational amplifier 70 is connected to a switch 72, and there is also provided a capacitor 74 and a field effect transistor 76. The field effect transistor 76 is connected by resistor 78 to a switch 80. The switch 80 is connected to the summing junction 56. The resistor 82 is connected to the junction of the resistor 78 and field effect transistor 76 and to ground.

A reference voltage supply 84 is provided, connected to the battery 44, through switch 86, to provide an output reference voltage of 2.5 volts at its output terminal 88. The switch 86 is controlled by the trigger 18, as described below in greater detail.

A signal adjustment means, generally designated 90, which, for example, may comprise a variable resistor, is connected to the temperature detection means 40 at the output thereof, to provide an adjustment to the magnitude of the second output signal generated by the temperature detection means 40.

An electronic timer 92, is connected to an electronic switch driver 94, which operates switches 62, 72, and 80. The electronic timer is also controlled by the trigger 18, through switch 96.

In the embodiment 10, the power for operation of the circuitry is provided by the battery 44. In order to indicate low battery voltage, a low battery voltage detector 98 is provided, and is connected to the digital display of the display means 46. The low battery voltage detector comprises an operational amplifier 100, and a pair of resistors 102 and 104, and causes the digital display 50 to display a unique visual signal when the battery voltage of the battery 44 drops to a predetermined value, such as, for example, 7 volts. When the signal caused by a low battery voltage detector 98 is shown on the digital display 50, the battery 44 should be replaced with a fully charged battery. The battery 44 may, for example, be a 9 volt battery.

As noted above, the embodiment 10 has two operating positions. In the first operating position, the trigger 18 is depressed part of the way back, to the position shown by line 22 in FIG. 1. When the trigger is depressed to the line 22 of FIG. 1, switch 62, which, for example, may be a normally closed switch, remains closed, switch 72 and switch 80, which may be normally open switches, remain open, switch 86, which may be a normally open switch, is closed, and switch 96, which may be a normally open switch, is open. With this condition of the switches, it can be seen from FIG. 2 that the signal biasing means 68 is not in the circuit, since switch 72, as well as switch 80, are open, and the sensitivity control means, generally designated 63, which is comprised of the switch 62 and resistors 64 and 66, is in its low sensitivity condition. With switch 96 open, there is no automatic control provided by the electronic switch driver 94 to the switches 62, 72, and 80. With the circuitry in the first operating condition as described, the digital display 50 will provide a reading of the rate of thermal radiation 28, received by the thermal radiation detection means 34. Since the rate of thermal radiation is proportional to the fourth power of the absolute temperature, appropriate adjustment is required to the second output signal generated by the temperature detection means 40. The temperature detection means 40 provides an output signal whose magnitude is proportional to the first power of the absolute temperature of, for example, the cold junction of the thermopile utilized as the thermal radiation detection means 34, and thus is the local or ambient temperature. Signal adjustment means 90 is utilized to adjust the magnitude of the second output signal generated by the temperature detection means 40, so that it is substantially proportional to the fourth power of the absolute temperature for temperatures within the predetermined temperature range, such as those normally encountered in, for example, buildings. Thus, in the first operating condition, for temperatures in the normal room temperature range, for example, 20° to 70° F., the signal adjustment means 90 increases the magnitude of the second output signal from the temperature detection means 40, so that it is substantially proportional to the fourth power of the absolute temperature. Thus, for temperatures in the range of normal or room temperatures, the digital display will show, when the embodiment 10 is in the first operating condition, a reading in the range of approximately 125 to 145 BTU's per square foot-hour. This is a typical value of the rate of heat being radiated from a typical indoor surface.

In the second operating condition, the trigger is depressed to the position indicated by the line 24 in FIG. 1. In the second operating condition, switch 86, of course, remains closed, and switch 96 is closed. The closing of switch 96 puts switches 62, 72, and 80 under the control of the electronic switch driver 94. Switch 62 of sensitivity control means 63 is opened, thereby putting the sensitivity control means 63 in its high gain condition through resistor 66. Switch 80 is closed, and switch 72 is initially closed. Switch 72 remains closed for a predetermined time period on the order of approximately 2 to 3 seconds and then opens. During the time that switch 72 is closed, capacitor 74 is charged by the operational amplifier 76 to the voltage necessary to bring the two inputs to the operational amplifier 70 to equal value. This "zeroes" the summing amplifier 60 such that the third output signal from the summing amplifier 60, when the embodiment 10 remains focused on the same surface 38, is zero and the digital display 50 will read approximately zero, that is, in the range of plus or minus 0.2 BTU's per square foot-hour. After switch 72 opens, the charge on the capacitor 74 and operating through the field effect transistor 76 maintains the same magnitude of signal at the summing junction 56 as was necessary to maintain the third output signal from the summing amplifier 60 at zero while the embodiment 10 was focused on the surface 38. If the embodiment 10 is then focused on a second surface, such as surface 38' of FIG. 1, the digital display will show a value that is equal to the rate of radiation heat transfer between the first surface 38 and the second surface 38'. If the second surface 38' is at the same temperature as the first surface 38, then, of course, there is no radiative heat transfer between two such surfaces, and the digital display 50 will continue to read substantially zero. If, however, the second surface 38' is at a different temperature from the first surface 38, there will be a reading on the display 50. If the second surface 38' is colder than the first surface 38, the digital display 50 will show a negative value, and if the second surface 38' is warmer than the first surface 38, the digital display 50 will show a positive value. These values will, for typical building constructions, be in the range, for example, between 1 and 14 BTU per square foot-hour.

Figures 3A, 3B, 3C:
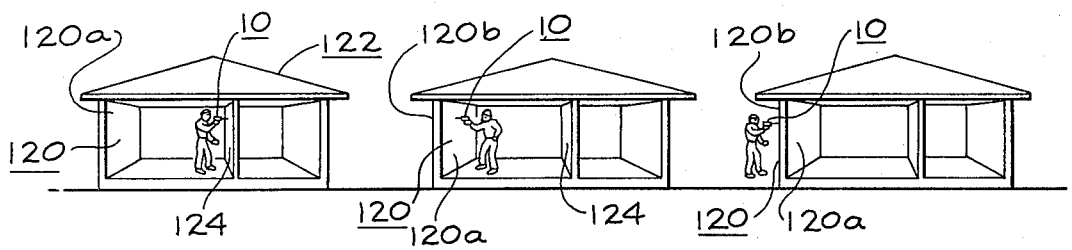
FIGS. 3A, 3B, and 3C are diagrammatic representations of utilization of the present invention.

The above described capabilities of the embodiment 10, operating in its first condition and its second condition allows the convenient and rapid determination of, for example, heat loss through a wall, as well as determination of the insulating characteristics of a wall. It will be appreciated, of course, that in illustrating the embodiment 10 in operation, for convenience there has been selected the utilization in determining the heat loss from building walls. However, the embodiment 10 is not so limited and may be utilized, of course, in many other applications. Referring now to FIGS. 3A, 3B, and 3C, the various steps utilized in making such determinations for the building are described.

For convenience, it has been found desirable in many applications, that the embodiment 10 be held in the first operating condition indicated by the line 22 in FIG. 1, for about three seconds before placing the embodiment 10 in the second operating condition illustrated by the line 24. This short delay allows the system components to stabilize.

In order to determine the net heat flow or heat loss through an outside wall, such as an external wall 120 of a building 122, the embodiment 10 is first aimed at an interior wall 124, as illustrated in FIG. 3A, and placed, as noted above, in the first condition for about three seconds. Then, while still aimed at the interior wall 124, the trigger 18 is depressed to the second operating condition, and remains focused on the internal wall 124. As noted above, the digital display will be a value of approximately zero, that is, within approximately plus or minus 0.2 BTU per square foot-hour. Keeping the trigger 18 in the second operating condition indicated by the line 24 of FIG. 1, the embodiment 10 is aimed at the interior surface 120a of the external wall 120 of the building 122. If the ambient temperature outside of building 122 is cooler than the temperature inside the building 122, which is the temperature of the wall 124, then there will be a negative reading on the digital display, which shows the rate of radiation heat transfer and therefore energy lost through the wall 120. For example, such a reading, depending on the difference between the temperature of the internal wall 124, the ambient temperature outside the building 122, and the insulating characteristics of the external wall 120, may be, as noted above, in a range of 1 to 14 BTU per square foot-hour. From the dimensions of the wall, for example, if it is an 8 foot high by 10 foot wide wall, this is a total of 80 square feet, and, consequently, the heat loss through the wall 120 would be 80 square feet times the reading on the digital display 50. If the reading on the digital display, for example, is a negative 6, then there are 480 BTU per hour being lost through the wall 120.

Figure 4:
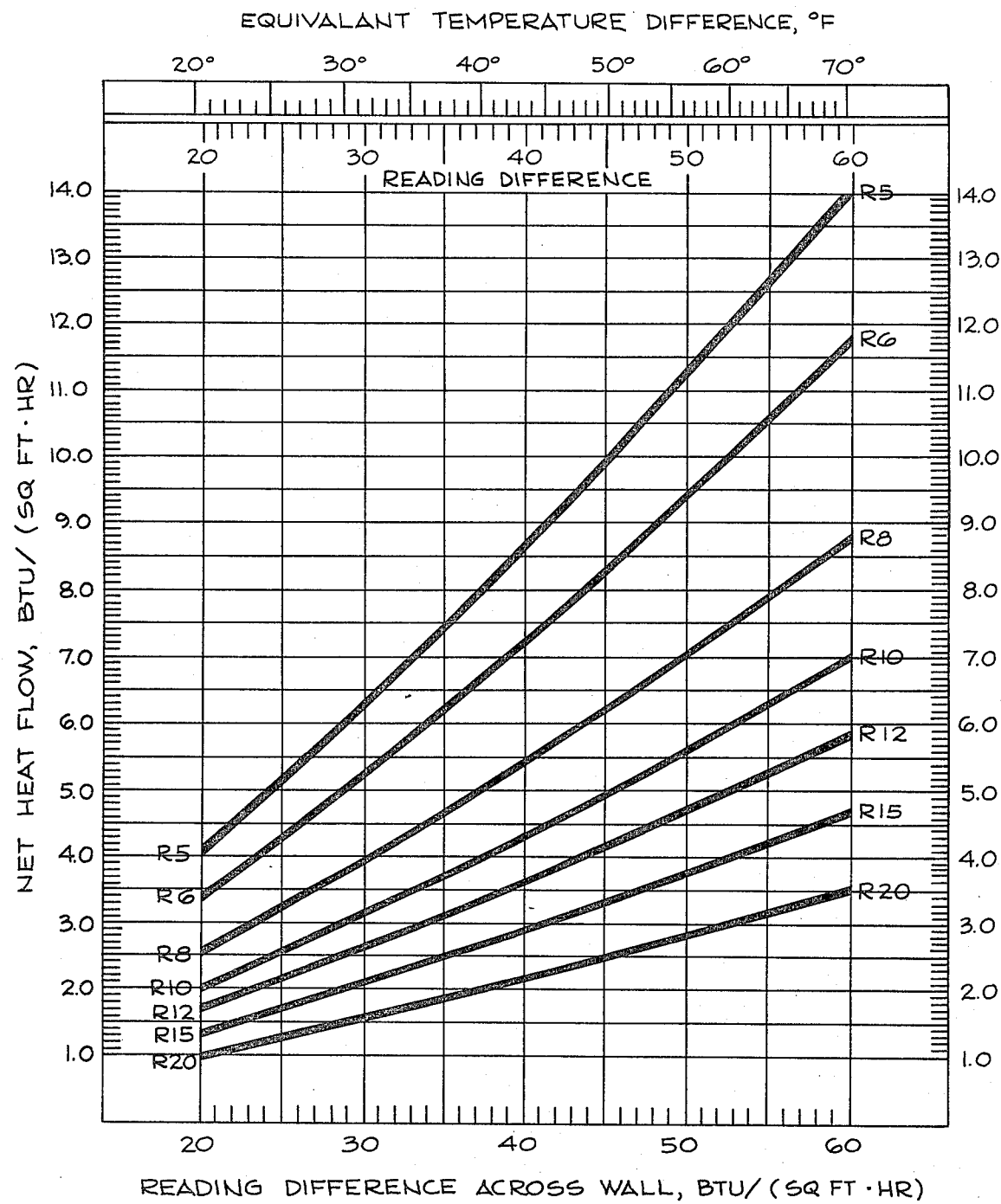
FIG. 4 is a graphical representation of characteristics useful in the practice of the present invention.

The embodiment 10 may also be utilized to determine the insulating value, or, as is conventional in the building trades, the R value of the wall 120. In order to determine the R value, the heat flow measurement, as above described, is first made and the net heat flow through the wall 120 is noted. The embodiment 10 is then focused on the internal surface 120a of the external wall 120, and placed in the first operating condition. The value on the digital display 50 is noted. Then, as illustrated in FIG. 3C, the embodiment 10 is focused on the exterior surface 120b of the exterior wall 120, and placed in the first operating condition. The reading on the digital display 50 is noted. For example, the reading when the embodiment 10 is focused on the internal surface 120a of the external wall 120, may be 135 BTU per square foot-hour, and when aimed at the external surface 120b of the external wall 120, may, for temperatures on the order of 20° F. outside of the building 122, be on the order of 90 BTU per square foot-hour. The difference between these two readings is then obtained by subtraction, and, for this example, would be 45 BTU per square foot-hour. In order to determine the R value of the external wall 120, a chart such as that shown on FIG. 4 is utilized. First the reading difference, as obtained by maintaining the embodiment 10 in the first operating condition and first aiming it at the internal surface 120a of the external wall 120, and then at the external surface 120b, as above described, is found on the horizontal scale and for the above example, was 45 BTU per square foot-hour. The net heat flow through the wall 120, as described above by utilizing the embodiment 10 in the second operating condition indicated by the line 24, which, as noted above, may, for example, be 6 BTU per square foot-hour, is found on the vertical scale, and the intersection on the chart 4, with the 45 BTU per square foot-hour reading difference, shows that the wall 120 has an insulating value of approximately R 8. (It is conventional in the building trades that the higher the R value of a wall, the greater is its insulating property and thus the less energy is lost through the wall.) For example, if the wall 120 had an insulating value of R 20, then the heat flow through the wall would only be on the order of 2.5 BTU per square foot-hour, and for an 8'×10' wall, would only be 200 BTU per hour.

This concludes the description of the preferred embodiment of the present invention. As noted above, the embodiment 10 has been described as utilized in determining heat loss and insulating value of a building. However, of course, this has been done for illustrative purposes only and is not limiting on the invention. The appended claims are intended to cover all variations and adaptations of Applicant's invention falling within the true scope and spirit thereof.

We claim:

1. A thermal radiation measuring arrangement for measuring the rate of thermal radiation emitted from a surface in a first operating condition and for measuring the rate of thermal radiation heat exchange between two surfaces in a second operating condition, and comprising, in combination:

thermal radiation detection means for receiving thermal radiation and generating a first output signal having a magnitude proportional to said thermal radiation;

temperature detection means for detecting the temperature in regions adjacent said thermal radiation detection means and generating a second output signal having a magnitude proportional to said detected temperature;

signal summing means for receiving said first output signal and said second output signal and generating a third output signal in response thereto, and said third output signal having a magnitude proportional to said sum of said first output signal and said second output signal in a first operating condition;

signal biasing means selectively connectable to said signal summing means for generating a fourth output signal having a first magnitude sufficient to cause said third output signal to be zero for said thermal radiation detection means receiving thermal radiation from a first surface, and said signal biasing means, including control means for maintaining said fourth output signal at said first magnitude thereof for said thermal radiation detection means receiving thermal radiation from a second surface, having a temperature different from said first surface;

switch means for selectively connecting said signal biasing means to said signal summing means in a second operating condition and disconnecting said signal biasing means from said signal summing means in said first operating condition;

whereby, said third output signal has a magnitude proportional to the rate of thermal radiation received by said thermal detection means in said first operating condition, and said third output signal has a magnitude proportional to the rate of radiation heat transfer between said first surface and said second surface in said second operating condition.

2. The arrangement defined in claim 1, and further comprising:

display means for receiving said third output signal and generating a visual display proportional thereto.

3. The arrangement defined in claim 2, wherein:

said display means further comprises a digital voltmeter for receiving said third output signal and generating a display signal having a magnitude proportional to the magnitude of said third output signal; and a digital readout means coupled to said digital voltmeter for providing a digital readout of said display signal.

4. The arrangement defined in claim 1, and further comprising:

sensitivity control means coupled to said signal summing means for providing a first gain through said third output signal in said first operating condition, and said sensitivity control means providing a second gain greater than said first gain to said third output signal in said second operating condition.

5. The arrangement defined in claim 4, wherein:

said second gain is on the order of 14.6 times said first gain.

6. The arrangement defined in claim 5, and further comprising:

display means for receiving said third output signal and generating a visual display proportional thereto.

7. The arrangement defined in claim 6, wherein:

said display means further comprises a digital voltmeter for receiving said third output signal and generating a display signal having a magnitude proportional to the magnitude of said third output signal; and a digital readout means coupled to said digital voltmeter for providing a digital readout of said display signal.

8. The arrangement defined in claim 1 wherein:

said radiation detection means comprises a thermopile.

9. The arrangement defined in claim 8, wherein:

said temperature detection means detects the temperature of the cold junction of said thermopile.

10. The arrangement defined in claim 9, and further comprising:

signal adjustment means coupled to said temperature detection means for adjusting the magnitude of said second output signal to be approximately proportional to the fourth power of the absolute temperature for a preselected range of said detected temperatures.

11. The arrangement defined in claim 10, and further comprising:

sensitivity control means coupled to said signal summing means for providing a first gain through said third output signal in said first operating condition, and said sensitivity control means providing a second gain greater than said first gain to said third output signal in said second operating condition.

12. The arrangement defined in claim 11, wherein:

said second gain is on the order of 14.6 times said first gain.

13. The arrangement defined in claim 12, and further comprising:

display means for receiving said third output signal and generating a visual display proportional thereto.

14. The arrangement defined in claim 13, wherein:

said display means further comprises a digital voltmeter for receiving said third output signal and generating a display signal having a magnitude proportional to the magnitude of said third output signal; and a digital readout means coupled to said digital voltmeter for providing a digital readout of said display signal.

* * * * *